(12) United States Patent
Schneider et al.

(10) Patent No.: US 8,684,643 B2
(45) Date of Patent: Apr. 1, 2014

(54) SHAFT COOLER FOR A TOOL MOTOR SPINDLE

(75) Inventors: Kurt Schneider, Jens (CH); Dominique Steffen, Langendorf (CH)

(73) Assignee: Step-Tec AG, Luterbach (CH)

( * ) Notice: Subject to any disclaimer, the term of this patent is extended or adjusted under 35 U.S.C. 154(b) by 947 days.

(21) Appl. No.: 12/741,866

(22) PCT Filed: Nov. 4, 2008

(86) PCT No.: PCT/EP2008/064900
§ 371 (c)(1),
(2), (4) Date: May 7, 2010

(87) PCT Pub. No.: WO2009/059954
PCT Pub. Date: May 14, 2009

(65) Prior Publication Data
US 2010/0252236 A1      Oct. 7, 2010

(30) Foreign Application Priority Data
Nov. 8, 2007   (EP) .................................... 07120261

(51) Int. Cl.
| | | |
|---|---|---|
| B23C 1/00 | (2006.01) | |
| B23B 47/00 | (2006.01) | |
| B23Q 5/04 | (2006.01) | |
| B23Q 11/12 | (2006.01) | |
| H02K 9/19 | (2006.01) | |
| H02K 9/193 | (2006.01) | |

(52) U.S. Cl.
USPC ............. 409/135; 409/231; 409/233; 408/56; 408/239 R; 310/54; 310/61

(58) Field of Classification Search
USPC ............. 409/135, 136, 231–233; 408/56, 57, 408/239 R, 239 A; 310/54, 61, 58; 464/17
See application file for complete search history.

(56) References Cited

U.S. PATENT DOCUMENTS

| | | | |
|---|---|---|---|
| 3,240,967 A * | 3/1966 | Krastchew ...................... | 310/54 |
| 3,571,634 A * | 3/1971 | Sato et al. ...................... | 310/54 |
| 3,740,596 A * | 6/1973 | Curtis et al. .................... | 310/54 |
| 4,114,058 A * | 9/1978 | Albaric ........................... | 310/54 |
| 4,951,578 A * | 8/1990 | von Haas et al. ............. | 409/136 |
| 5,145,298 A * | 9/1992 | Marantette .................... | 409/135 |

(Continued)

FOREIGN PATENT DOCUMENTS

| | | | |
|---|---|---|---|
| CA | 2160193 A | * | 4/1996 |
| DE | 19543612 C1 | * | 5/1997 |

(Continued)

OTHER PUBLICATIONS

EP 1736277 A2—English Translation.*

*Primary Examiner* — Erica E Cadugan
(74) *Attorney, Agent, or Firm* — Bachman & LaPointe, P.C.

(57) ABSTRACT

A shaft cooler (1) for a tool motor spindle (2), which has a rotating shaft (3), a static lance (4), and at least one coolant loop (7), which comprises a coolant inlet (5) and a coolant outlet (6), said shaft cooler being implemented such that the flow of the coolant from the static lance (4) into the rotating shaft (3) is performed via a flow path that includes radially-extending cooling holes (31) to cause the coolant to flow from a radially inside location to a radially outside location.

9 Claims, 7 Drawing Sheets

(56) References Cited

U.S. PATENT DOCUMENTS

| | | | |
|---|---|---|---|
| 5,192,139 A | | 3/1993 | Hiramoto et al. |
| 5,672,035 A | * | 9/1997 | Pawlik ............ 409/135 |
| 6,050,756 A | * | 4/2000 | Buchholz et al. ............ 409/131 |
| 6,398,468 B1 | | 6/2002 | Bayer et al. |
| 6,568,886 B1 | * | 5/2003 | Lind ............ 409/136 |
| 6,672,809 B2 | * | 1/2004 | Senzaki ............ 409/136 |
| 6,705,431 B2 | * | 3/2004 | Matsuura et al. ............ 184/7.4 |
| 6,896,455 B2 | * | 5/2005 | Anderson ............ 409/233 |
| 7,025,543 B2 | * | 4/2006 | Curtis ............ 409/131 |
| 7,287,941 B1 | * | 10/2007 | Erickson ............ 409/233 |
| 7,476,066 B2 | * | 1/2009 | Topf ............ 408/56 |
| 2010/0014932 A1 | * | 1/2010 | Albinsson et al. ............ 408/56 |
| 2012/0219374 A1 | * | 8/2012 | Norihisa ............ 409/135 |

FOREIGN PATENT DOCUMENTS

| | | | | |
|---|---|---|---|---|
| EP | 368023 | A | * | 5/1990 |
| EP | 0458499 | | | 11/1991 |
| EP | 1736277 | | | 12/2006 |
| JP | 63-077636 | A | * | 4/1988 |
| JP | 01 087130 | | | 3/1989 |
| JP | 10-080839 | | * | 3/1998 |
| JP | 2001-310210 | A | * | 11/2001 |
| WO | 2006018394 | | | 2/2006 |

* cited by examiner

US 8,684,643 B2

SHAFT COOLER FOR A TOOL MOTOR SPINDLE

BACKGROUND OF THE INVENTION

The invention relates to a shaft cooling system for a tool motor spindle, comprising a rotating shaft, a static lance and at least one cooling circuit having a coolant intake and a coolant outlet.

The tool motor spindles are operated at high rotational speeds. These high rotational speeds make great demands on the bearing arrangement via which the spindle is mounted, so as to be rotatable about its spindle axis, in the spindle housing. In particular, the bearing friction must be reduced to an absolute minimum, in order to reduce the generation of heat and the wear. It is therefore necessary to provide a shaft cooling system.

Such a shaft cooling system is described in WO 2006/018394 A1. Described therein is a spindle device comprising a shaft device and a cooling device. The cooling device has at least one convection gap, via which a substantial portion of dissipated heat can be removed from the shaft device in targeted fashion.

Additionally known are tool motor spindles that are externally cooled for the purpose of removing the dissipated power.

The disadvantages that exist in the case of these known shaft cooling systems consist, in particular, in that, owing to the insufficient cooling action, an insufficiently reduced shaft growth occurs as a result of the thermal expansion.

The object of the invention therefore consists in proposing a shaft cooling system that, on the one hand, reduces a longitudinal growth of the shaft to a minimum and, on the other hand, owing to the smallness of the longitudinal growth, ensures a high measurement accuracy in the dimensional checking of the workpiece.

SUMMARY OF THE INVENTION

According to the invention, this object is achieved in that the shaft cooling system is realized in such a way that feeding of the cooling medium into the static lance is effected via cooling bores, from the inside outwards into the rotating shaft.

BRIEF DESCRIPTION OF THE DRAWINGS

An exemplary embodiment according to the invention is represented in the following drawings, wherein.

DETAILED DESCRIPTION

Figure 1:
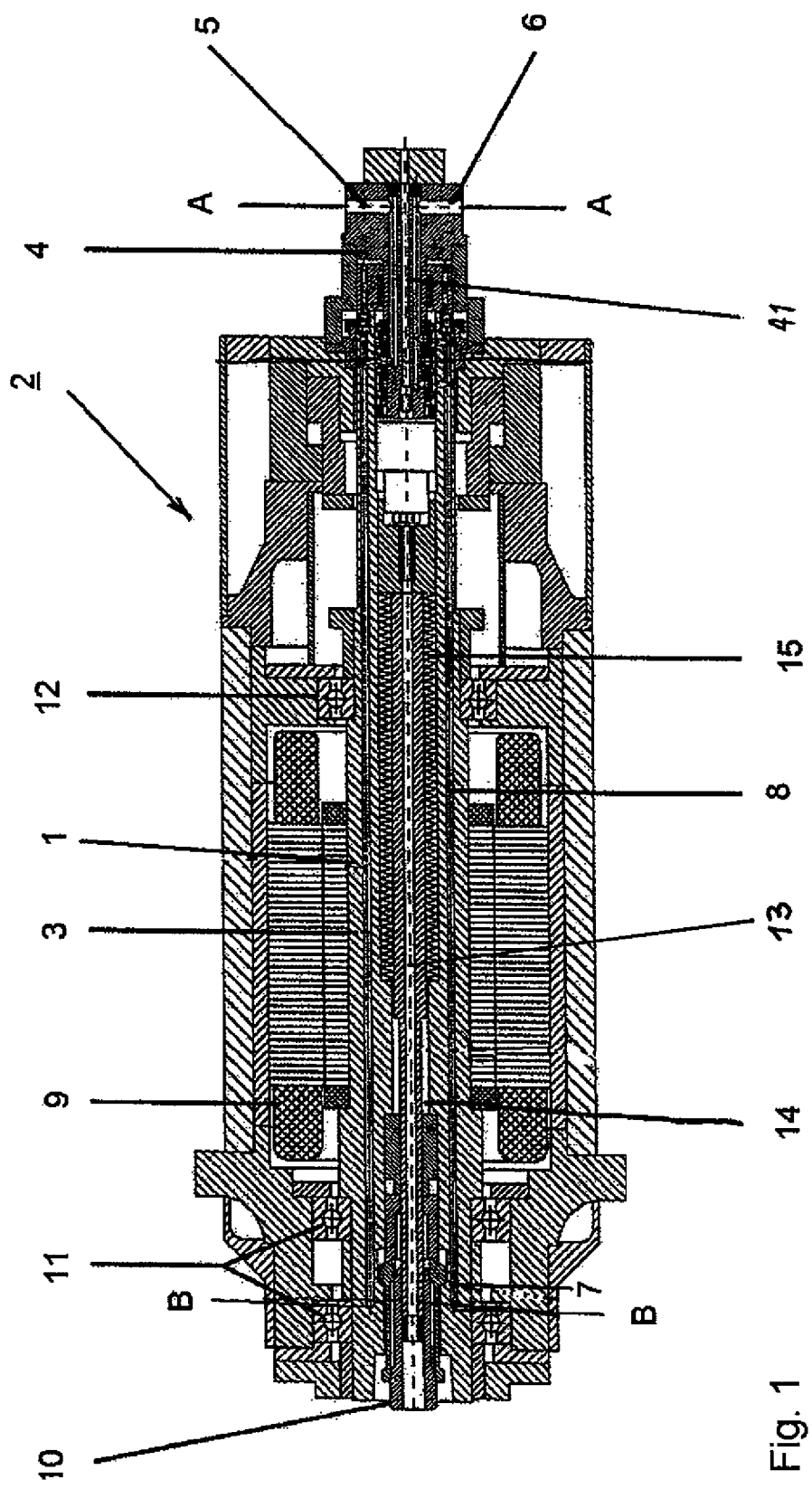
FIG. 1 shows a sectional drawing of a shaft-cooled tool motor spindle.

FIG. 1 shows a sectional view of a tool motor spindle 2. A stator 9, usually a 3-phase motor winding, which is fitted into a spindle sleeve, drives a rotor mounted on a through shaft 3. The shaft 3 is realized as a hollow shaft and is multiply mounted in a spindle sleeve by means of a front bearing 11 and a rear bearing 12. Furthermore, the shaft 3 is provided with a co-rotating chucking device, consisting of a tool chuck 15 and a collet 10, and is located in the shaft bore 14. This chucking device serves to chuck a machining tool by means of a collet 10. The machining tool, not represented in the figure, is put into rotation by means of a motor. On the one hand, coolant, for internal cooling of the tool, is guided through the bore 13 of the tool chuck 15, and on the other hand compressed air, for cleaning the tool interface, is also routed through the shaft 3. The shaft 3 has cooling bores 8, which are constituent parts of the shaft cooling system 1.

All media mentioned are fed into the rotating shaft 3 through the lance 4, which is provided with a central bore 41. At the start of the cooling circuit 7, the cooling medium is introduced into the coolant intake 5 and, after cooling, it emerges from the coolant outlet 6.

Figure 2:
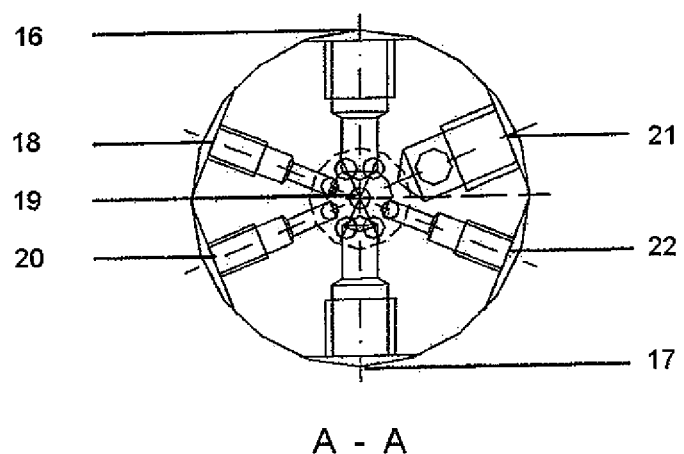
FIG. 2 shows a sectional representation A-A of the rear portion of the lance.

The section A-A of FIG. 1 is represented in FIG. 2. In this example, four media are fed in or drawn off. The coolant forward-flow is denoted by 16 and the coolant return is denoted by 17. The coolant leakage is drawn off via the connection 18. The connections 19 and 20 serve, respectively, to supply the tool inner cooling (cooling lubricant) and to remove the leakage of the cooling lubricant. The taper cleaning air is supplied into the intake 21. For the purpose of sealing the system, the sealing air is fed in via the line 22.

Figure 3:
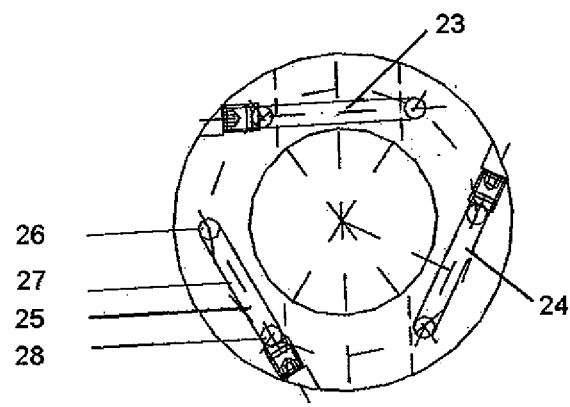
FIG. 3 shows a sectional representation B-B of the front portion of the shaft.

The front shaft portion is shown, by way of example, in the section B-B in FIG. 3. In this embodiment, the shaft 3 is arranged with three cooling-circuit loops 23, 24 and 25 distributed eccentrically and symmetrically. All three cooling loops 23, 24 and 25 are realized with a forward-flow, axially parallel bore 26 and with a like second, return bore 28 adjacent thereto. In the foremost shaft region, these two bores 26 and 28 are connected to each other by a transverse bore 27 that is closed on one side, this constituting a cooling loop in the cooling circuit 7.

Figure 4:
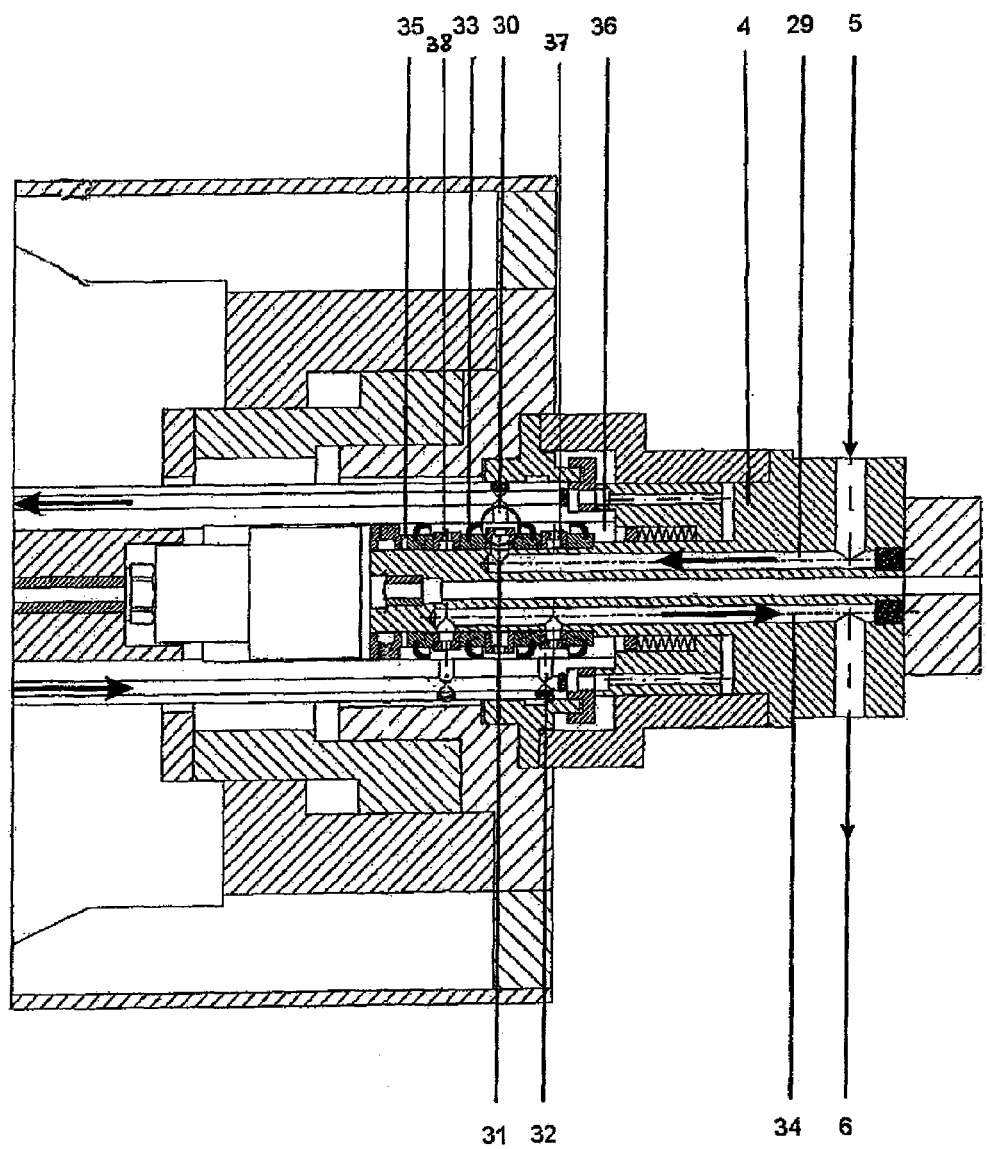
FIG. 4 shows a sectional drawing of the front lance portion.

FIG. 4 shows a sectional view of the cooling system in the front portion of the lance 4. A cooling medium delivered and temperature-controlled by a cooling device, for example water enriched with chemical stabilizing additives, is fed in under pressure to the connection 5 of the stationary lance 4, which is screwed onto the rear spindle flange. The cooling medium is first brought into the transfer region 30 through two bores 29 that extend parallelwise. The radial transfer is effected at the end of the bores 29, into a bore 31 equal in area, perpendicularly relative to the longitudinal axis. The cooling water now emerging from the stationary part passes, via the resultant circulatory flow between the lip-seals 33, into the three forward-flow bores 26 (see FIG. 3) of the shaft 3, which are distributed by 120°. The cooling medium emerging under pressure thereby reinforces the sealing behaviour of the externally sealing lip-seals 33 in respect of the rotating shaft inner contour. In the region 30 of the radial transfer of the cooling medium, the latter undergoes additional acceleration, owing to the centrifugal force by the rotating shaft 3. The exploitation of this physical property is the key to the realization of the transfer of media from the static portion to the dynamic portion. The cooling medium in the forward-flow bores 31 passes, via the reversing loops (transverse bores 27 (FIG. 3) in the foremost shaft portion), into the return bores 32. In the region of the lance 4, the radial transfer is effected from the rotating portion into the stationary portion, in that the cooling medium passes, via two circulatory flows 37, 38 in two bores 31, 32 extending perpendicularly relative to the longitudinal axis, into two return bores 34 that extend parallelwise. The integration of the lip-seals 33 naturally results in a different arrangement for the return, with a theoretically greater leakage at the seal facing away from the pressure chamber. In order to prevent this, in this example two radial transfers are provided for the purpose of halving the return pressure, which has been reduced in any case. This symmetrical seal arrangement (high-pressure flow on both sides enclosed by two low-pressure returns) serves to additionally wet the sealing surfaces of the inwardly facing lip-seals 33. Owing to the lubricating effect, this results in an increased service life of the forward-flow seals, which are under greater pressure, as described below in FIG. 5. The leakage cooling medium is taken out of the lance 4 via the circulatory flows 35 and via a return of its own. The coolant leakage passes into the circulatory flow 36. Finally, the cooling medium is returned into the cooling device via the connection 6.

Figure 5:
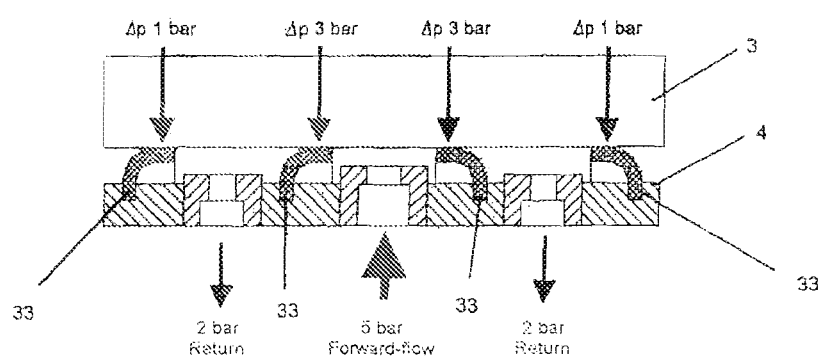
FIG. 5 shows a sectional drawing of the lip-seals.

Represented in FIG. 5 is the seal symmetry of the lip-seals 33 of the present invention. The lip-seals 33 are mounted on the lance 4, between the rotating shaft 3 and the stationary lance 4. The two outer lip-seals 33 are subjected to a lower pressure (1 bar) than are the two inner lip-seals 33 (3 bar). The forward-flow and return pressures occurring in the example result in differing differential pressures ensuing at the externally sealing lips 33. Owing to this symmetrical arrangement, the inner lip-seals 33, which are subjected to the greater loading, are lubricated and cooled, which results in an increased service life.

Figure 6:
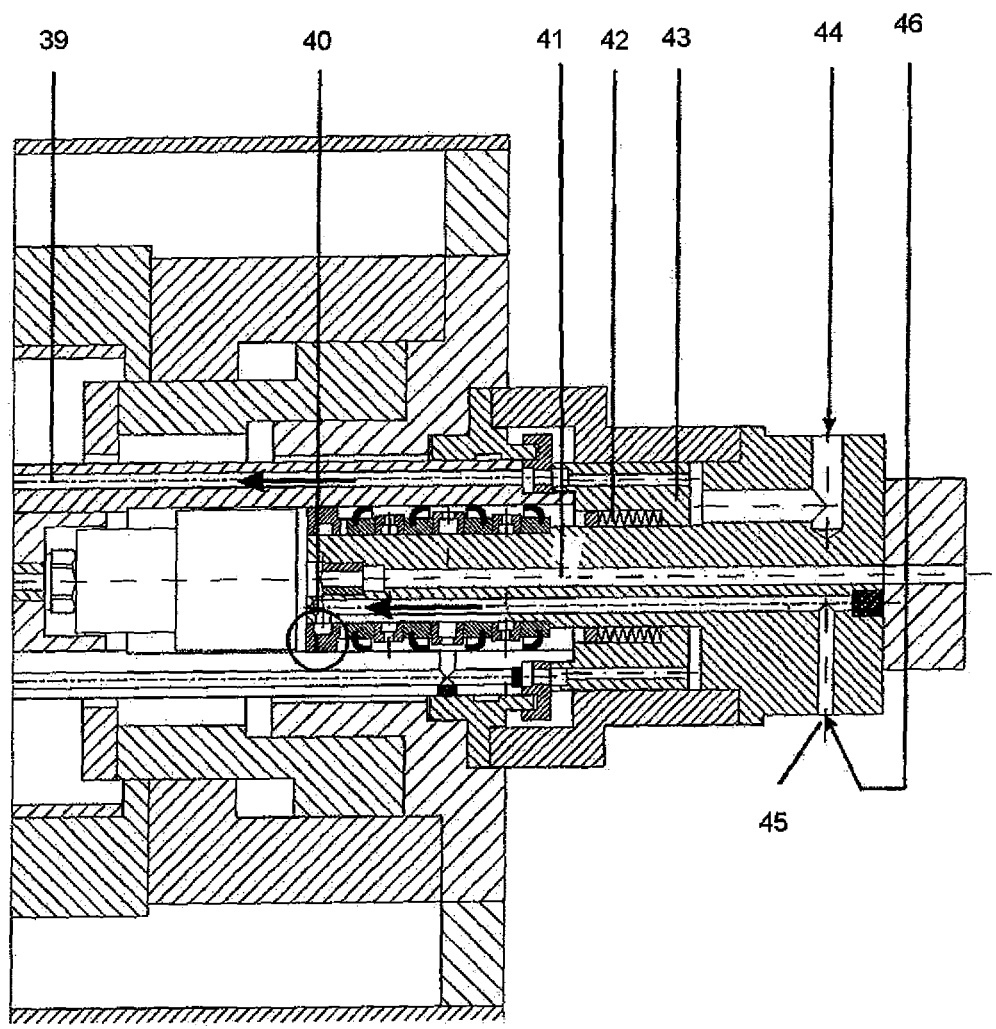
FIG. 6 shows a sectional drawing to represent the cleaning of the tool taper and the sealing air.

FIG. 6 shows the routing of the taper cleaning air and of the sealing air in the tool motor spindle. The taper cleaning air is fed in via the connection 44 of the lance 4, which is provided with a central bore 41. This air is used to purge the tool taper, and is connected-in only when the spindle is at a standstill. When the spindle is rotating, the taper cleaning piston 43 is raised from the rotating sealing surface of the shaft 3 by the compression spring 42. In the standstill state, the pressure of the taper cleaning air is able to move the piston 43 forwards, in order to lay open to the air the passage into the taper cleaning bore 39 of the shaft 3. The sealing air 45, fed into the connection 46, serves to seal off the lance 4 in respect of the outer regions. The two leakage media (cooling medium and cooling lubricant) must be separated by means of the sealing air, because of their differing chemical composition. The radial transfer of the sealing air is effected at the end of the bore 40, via the circulatory flow and the small bore to both sides of the shaft 3. This positive pressure has the effect that, on the one hand, no leakage cooling water passes into the interior of the shaft and, on the other hand, no leakage cooling lubricant penetrates into the region of the lance 4.

Figure 7:
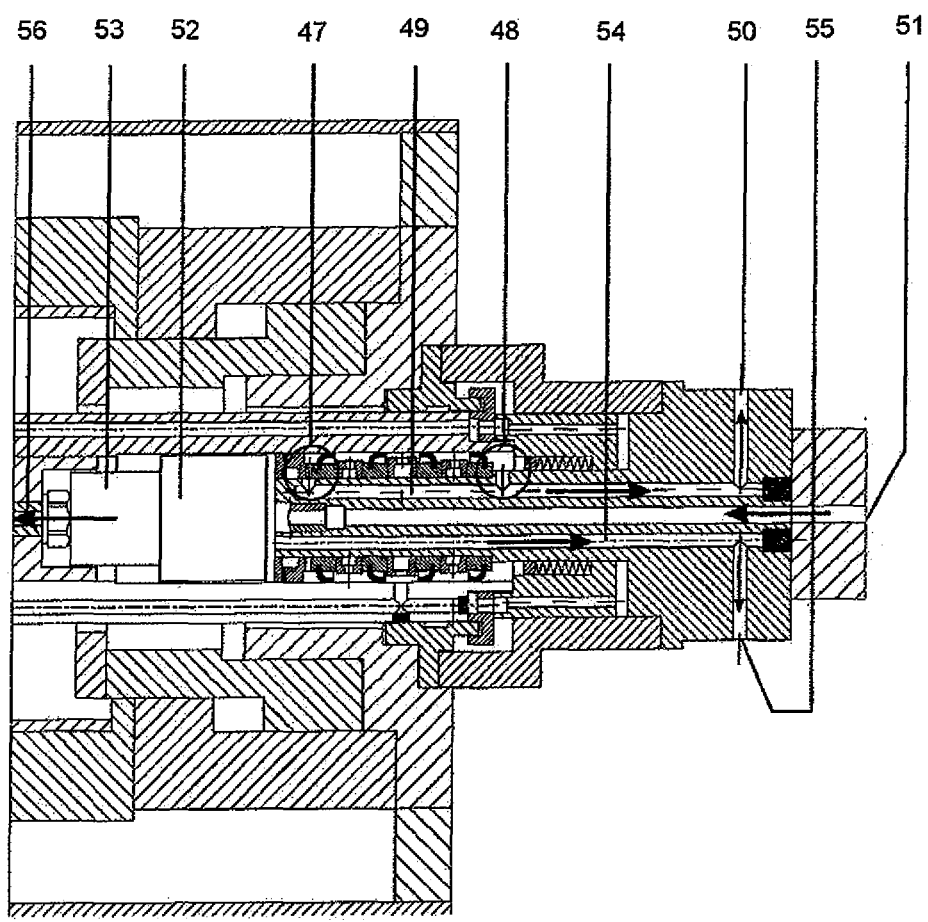
FIG. 7 shows a sectional drawing of the leakages/tool inner cooling with internal rotary leadthrough.

FIG. 7 shows the leakage routing and the tool inner cooling. The leakage of the cooling water return escaping through the outer lip-seals 33 collects in the region of the circulatory flows 47 and 48. The radial return of the leakage is effected through the two transverse bores that open perpendicularly into the axial leakage bore 49.

Finally, the leakage of the cooling water is routed back into the cooling device via the connection 50.

Cooling lubricant for the tool inner cooling is fed in via the connection 51. This cooling lubricant is transferred through the stationary lance 4 to the stationary part 52 of an integrated rotary leadthrough that is already present. The cooling lubricant, finally, is routed forwards to the tool interface, via the bore 56, through the rotating part 53 of this rotary leadthrough through the rest of the shaft portion.

Emerging or backed-up cooling lubricant from the rotary leadthrough is directed backwards, as leakage, via the axially extending leakage bore 54, and routed out of the lance 4 via the connection 55.

Figure 8:
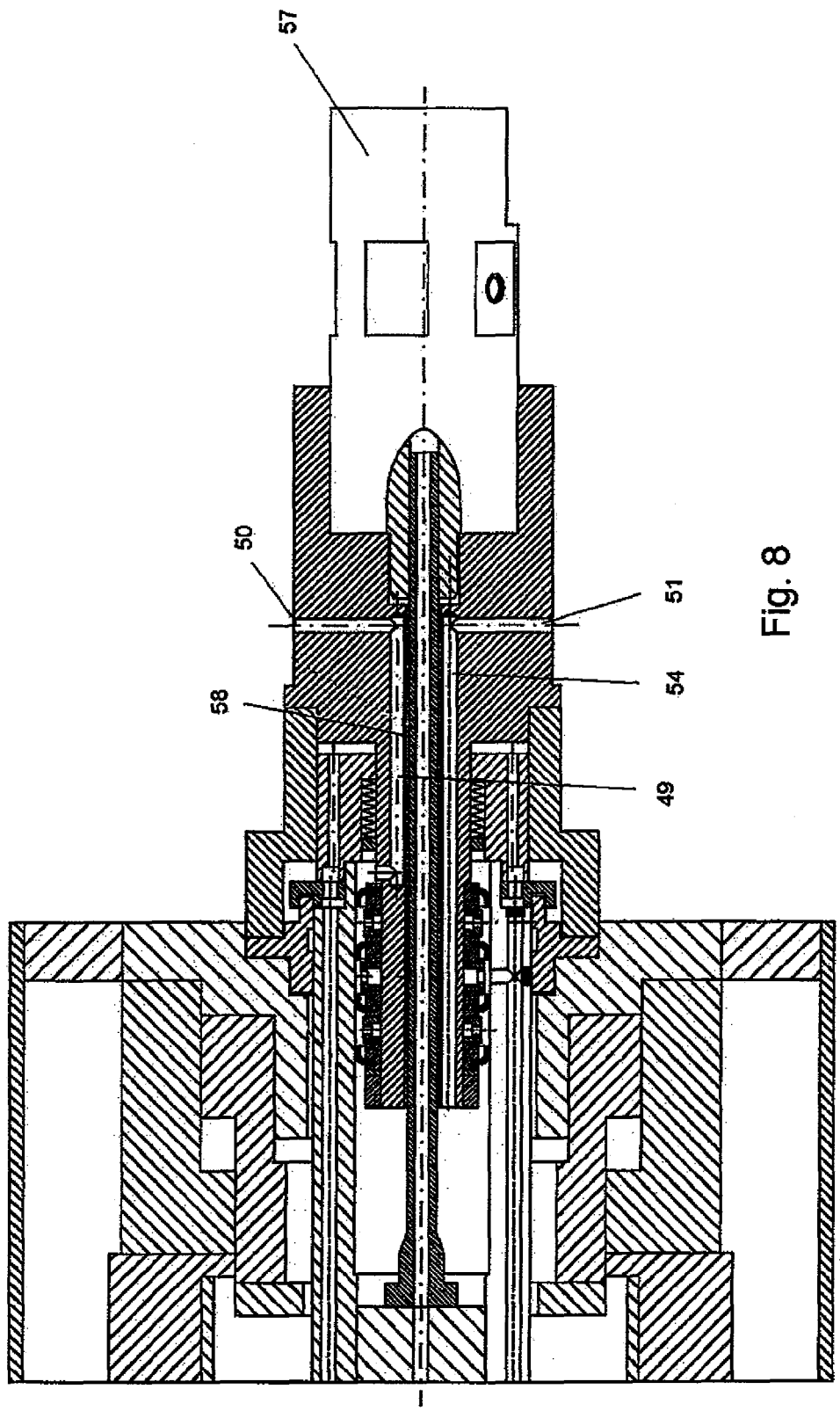
FIG. 8 shows a sectional drawing of the leakages/tool inner cooling with outer rotary leadthrough.

FIG. 8 shows an exemplary variant of the shaft cooling system. In contrast to FIG. 7, which shows an inner rotary inlet 52, 53, this shaft cooling system has an outer rotary feeder 57. This rotary feeder 57 can be exchanged without removal of the entire lance 4. The sealing-air separation between the inner cooling medium and the shaft cooling medium is omitted. The tool inner cooling is denoted by the reference numeral 58.

The purpose, and the advantages resulting therefrom, of cooling the rotating shaft is, on the one hand, to have a "cool shaft", which limits to a minimum the longitudinal growth that ensues with increasing temperature. This results in improved machining quality of each machining centre where this motor spindle according to the invention is installed. The second advantage of this reduced longitudinal growth of the shaft, or of the tool holder in respect of the spindle nose, is an improved measurement accuracy in the dimensional checking of workpieces. This enables 3-D probes to be inserted in the "cool" tool interface, without the sensitive measuring probe lengthening concomitantly as a result of an excessively warm shaft, this resulting in highly accurate measurement results. Owing to the lesser temperature difference between the shaft and the bearing housing, the bearings can be designed with a narrower tolerance range, this resulting in greater rigidity during operation and in an improved service life of the motor spindle.

The invention claimed is:

1. Shaft cooling system for a tool motor spindle, the system comprising
    a rotating shaft configured to support a tool at a front end of the system,
    at least one cooling bore in the rotating shaft,
    a stationary lance, located at a rear end of the system, for supplying a cooling medium, and
    at least one cooling circuit having a cooling medium intake and a cooling medium outlet, and having a forward flow path through which the cooling medium flows in a direction from the rear of the system towards the front of the system, and also having a return flow path through which the cooling medium flows in a direction from the front of the system towards the rear of the system,
    wherein, in the at least one cooling circuit, the cooling medium is fed into the stationary lance and into the at least one cooling bore in the rotating shaft, and is fed from the at least one cooling bore in the rotating shaft back into the stationary lance, and wherein a plurality of lip-seals are arranged in a sealing manner on the stationary lance between the shaft and the lance, and the plurality of lip-seals delimit the forward and return flow ahs of the cooling medium from each other.

2. Shaft cooling system according to claim 1, wherein the stationary lance has a central through bore.

3. Shaft cooling system according to claim 1, wherein the at least one cooling bore comprises a plurality of cooling bores, and wherein the shaft is cooled by means of the cooling medium flowing through the plurality of cooling bores.

4. Shaft cooling system according to claim 1, wherein a plurality of media are fed into the lance.

5. Shaft cooling system according to claim 1, wherein the system is sealed by means of sealing air.

6. Shaft cooling system according to claim 1, wherein the at least one cooling circuit has a plurality of circuit loops.

7. Shaft cooling system according to claim 1, including means for rotating the shaft, wherein the cooling medium is subjected to a centrifugal force and is transported in a radial direction with respect to an axis of rotation of the rotating shaft.

8. Shaft cooling system according to claim 1, wherein the lip-seals are arranged symmetrically with respect to a portion of the forward flow path that extends radially with respect to an axis of rotation of the rotating shaft.

9. Shaft cooling system according to claim 1, wherein the cooling medium is fed from the cooling medium intake to the stationary lance and from the rotating shaft to the cooling medium outlet.

\* \* \* \* \*

UNITED STATES PATENT AND TRADEMARK OFFICE
CERTIFICATE OF CORRECTION

| | | |
|---|---|---|
| PATENT NO. | : 8,684,643 B2 | Page 1 of 1 |
| APPLICATION NO. | : 12/741866 | |
| DATED | : April 1, 2014 | |
| INVENTOR(S) | : Kurt Schneider et al. | |

It is certified that error appears in the above-identified patent and that said Letters Patent is hereby corrected as shown below:

In the Claims

In column 4, claim 1, line 49, delete "ahs" and insert --paths-- in its place.

Signed and Sealed this
Ninth Day of September, 2014

Michelle K. Lee
*Deputy Director of the United States Patent and Trademark Office*